United States Patent
Caraballo et al.

(10) Patent No.: US 9,462,126 B2
(45) Date of Patent: Oct. 4, 2016

(54) TRACKING INDIVIDUALS USING VOICE VERIFICATION

(75) Inventors: Juan F. Caraballo, Boca Raton, FL (US); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1817 days.

(21) Appl. No.: 12/037,786

(22) Filed: Feb. 26, 2008

(65) Prior Publication Data

US 2009/0214004 A1  Aug. 27, 2009

(51) Int. Cl.
*H04M 1/64* (2006.01)
*H04M 3/51* (2006.01)
*G10L 17/00* (2013.01)
*H04M 3/493* (2006.01)

(52) U.S. Cl.
CPC ............ *H04M 3/5158* (2013.01); *G10L 17/00* (2013.01); *H04M 3/4936* (2013.01)

(58) Field of Classification Search
CPC ............. H04M 11/04; H04M 11/045; H04M 2201/40; H04M 1/271; H04M 3/493; H04M 2203/2061; H04M 1/6505; H04M 3/533; H04M 3/36; H04M 3/537; H04M 3/5307; H04M 2201/60; H04M 3/4938; H04M 3/53325; H04M 3/42059; H04M 1/663
USPC .......... 379/49, 38, 51, 88.02–88.21; 713/186
See application file for complete search history.

(56) References Cited

U.S. PATENT DOCUMENTS

| | | | |
|---|---|---|---|
| 6,671,672 B1* | 12/2003 | Heck ....................... | G10L 17/24 704/273 |
| 6,728,341 B1* | 4/2004 | Puchek et al. .................. | 379/49 |
| 2002/0051522 A1* | 5/2002 | Merrow et al. ............ | 379/88.01 |
| 2004/0243431 A1* | 12/2004 | Katz ...................... | G06Q 10/10 455/405 |
| 2006/0020459 A1* | 1/2006 | Carter et al. .................. | 704/246 |
| 2008/0026751 A1* | 1/2008 | Alaksza et al. ............ | 455/435.1 |
| 2009/0010402 A1* | 1/2009 | Heimbecher ....... | H04M 19/041 379/88.21 |

* cited by examiner

*Primary Examiner* — Akelaw Teshale
(74) *Attorney, Agent, or Firm* — Steven M. Grenberg, Esq.; CRGO Law

(57) ABSTRACT

A method for tracking the location of an individual can include selecting a first audio clip from a plurality of audio clips, wherein each audio clip comprises a different question for the individual and wherein a correct answer corresponds to each audio clip. The method can further include initiating a telephone call to a telephone of the individual at a desired location and playing the first audio clip for the individual via the telephone call. The method can further include receiving an oral response to the first audio clip from the individual via the telephone call and executing a speech recognition process upon the oral response. The method can further include comparing the oral response to a voice print of the individual and storing a record indicating that the individual is compliant if the oral response matches the correct answer and the oral response matches the voice print.

18 Claims, 3 Drawing Sheets

TRACKING INDIVIDUALS USING VOICE VERIFICATION

BACKGROUND OF THE INVENTION

1. Field of the Invention

The present invention relates to tracking technology, and more particularly relates to the tracking of individuals using voice verification technology.

2. Description of the Related Art

In various situations, it is desirable to track the location of an individual so as enforce a restriction on the individual's movement. Examples include individuals under house arrest, hospitalized individuals, individuals under medical orders restricting movement and children being cared by others. In these instances it is desirable to monitor the location of the individual so as to determine whether the individual is complying with the restriction on movement imposed on him or her. Enforcing such a restriction using a human overseer can be expensive and time consuming. Thus, various technological approaches to this problem have arisen.

One approach to this problem includes the use of Radio Frequency Identifier (RFID) units to track the individual's location. External RFID units worn by the individual, however, can be tampered with and are not highly reliable. RFID units internal to an individual could be more reliable, but installation of such a unit would be intrusive to the individual and can be illegal. Further, RFID units are subject to radio interference caused by buildings, objects and radio frequency signals. Lastly, RFID units can be damaged by trauma, sudden movements, water and other precipitation, thereby affecting its reliability.

Another approach to the problem of tracking the location of individuals involves the use of cameras placed at the location of the individual so as to verify that the presence of the individual at the location. Conventional camera-based tracking of individuals, however, also requires human intervention, which can be costly. Furthermore, cameras are vulnerable to circumvention using fake photographic effects.

Therefore, a need arises for a more efficient method for tracking the location of individuals and more particularly for an automated, low-cost solution to monitoring an individual.

BRIEF SUMMARY OF THE INVENTION

Embodiments of the present invention address deficiencies of the art in respect to automatic speech recognition and provide a novel and non-obvious method, server and computer program product for tracking the location of an individual. In one embodiment of the invention, a method for tracking the location of an individual can include selecting a first audio clip from a plurality of audio clips, wherein each audio clip comprises a different question for the individual and wherein a correct answer corresponds to each audio clip. The method can further include initiating a telephone call to a telephone of the individual at a desired location and playing the first audio clip for the individual via the telephone call. The method can further include receiving an oral response to the first audio clip from the individual via the telephone call and executing a speech recognition process upon the oral response. The method can further include comparing the oral response to a voice print of the individual and storing a record indicating that the individual is compliant if the oral response matches the correct answer corresponding to the first audio clip and the oral response matches the voice print.

In yet another embodiment of the invention, a computer program product comprising a computer usable medium embodying computer usable program code for tracking the location of an individual can be provided. The computer program product includes computer usable program code for selecting a first audio clip from a plurality of audio clips, wherein each audio clip comprises a different question for the individual and wherein a correct answer corresponds to each audio clip. The computer program product further includes computer usable program code for initiating a telephone call to a telephone of the individual at a desired location and playing the first audio clip for the individual via the telephone call. The computer program product further includes computer usable program code for receiving an oral response to the first audio clip from the individual via the telephone call and executing a speech recognition process upon the oral response. The computer program product further includes computer usable program code for comparing the oral response to a voice print of the individual and storing a record indicating that the individual is compliant if the oral response matches the correct answer corresponding to the first audio clip and the oral response matches the voice print.

In yet another embodiment of the invention, a server for tracking the location of an individual can be provided. The server can include a repository for storing a plurality of audio clips, wherein each audio clip comprises a different question for the individual and wherein a correct answer corresponds to each audio clip. The repository may further store a telephone number of the individual, the telephone number corresponding to a telephone at a desired location, and a voice print for the individual. The server further includes a processor configured for selecting a first audio clip from the plurality of audio clips and initiating a telephone call to the telephone of the individual. The processor is further configured for playing the first audio clip for the individual via the telephone call and receiving an oral response to the first audio clip from the individual via the telephone call. The processor is further configured for executing a speech recognition process upon the oral response and comparing the oral response to the voice print. The processor is further configured for storing a record indicating that the individual is compliant if the oral response matches the correct answer corresponding to the first audio clip and the oral response matches the voice print.

In yet another embodiment of the present invention, an alternative method for tracking the location of an individual is provided. The method includes receiving a telephone call that is automatically initiated by a mobile telephone when the mobile telephone reaches a predefined location and selecting a first audio clip from a plurality of audio clips, wherein each audio clip comprises a different question for the individual and wherein a correct answer corresponds to each audio clip. The method can further include playing the first audio clip for the individual via the telephone call. The method can further include receiving an oral response to the first audio clip from the individual via the telephone call and executing a speech recognition process upon the oral response. The method can further include comparing the oral response to a voice print of the individual and storing a record indicating that the individual is compliant if the oral response matches the correct answer corresponding to the first audio clip and the oral response matches the voice print.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to automatic speech recognition and provide a novel and non-obvious method, server and computer program product for tracking the location of an individual. First, a voice print of the individual is taken and a telephone number of a stationary telephone of the individual is stored, wherein the telephone is at a location at which it is desired the individual will be present. At a predefined time and day, a first question is selected from a plurality of available questions and a telephone call is initiated to the stored telephone number of the individual. The selected question is played for the individual via the telephone call and the individual provides an oral response. A speech recognition process is executed upon the oral response and the oral response is compared to a voice print of the individual. The individual is compliant if the oral response matches the correct answer to the corresponding question and the oral response matches the voice print. The individual is not compliant if either the oral response doesn't match the correct answer to the corresponding question or the oral response doesn't match the voice print.

In another embodiment of the present invention, a telephone number of an Interactive Voice Response (IVR) system and a set of predefined locations are stored on the mobile telephone of the individual. A Global Positioning System (GPS), or other location defining device, is integrated with the mobile telephone. When the mobile telephone reaches each of the predefined locations, a telephone call is initiated to the telephone number of the IVR system. Subsequently, as above, the IVR selects a question, plays it for the individual, solicits an answer, compares it to the voice print and determines whether the individual is compliant.

Figure 1:
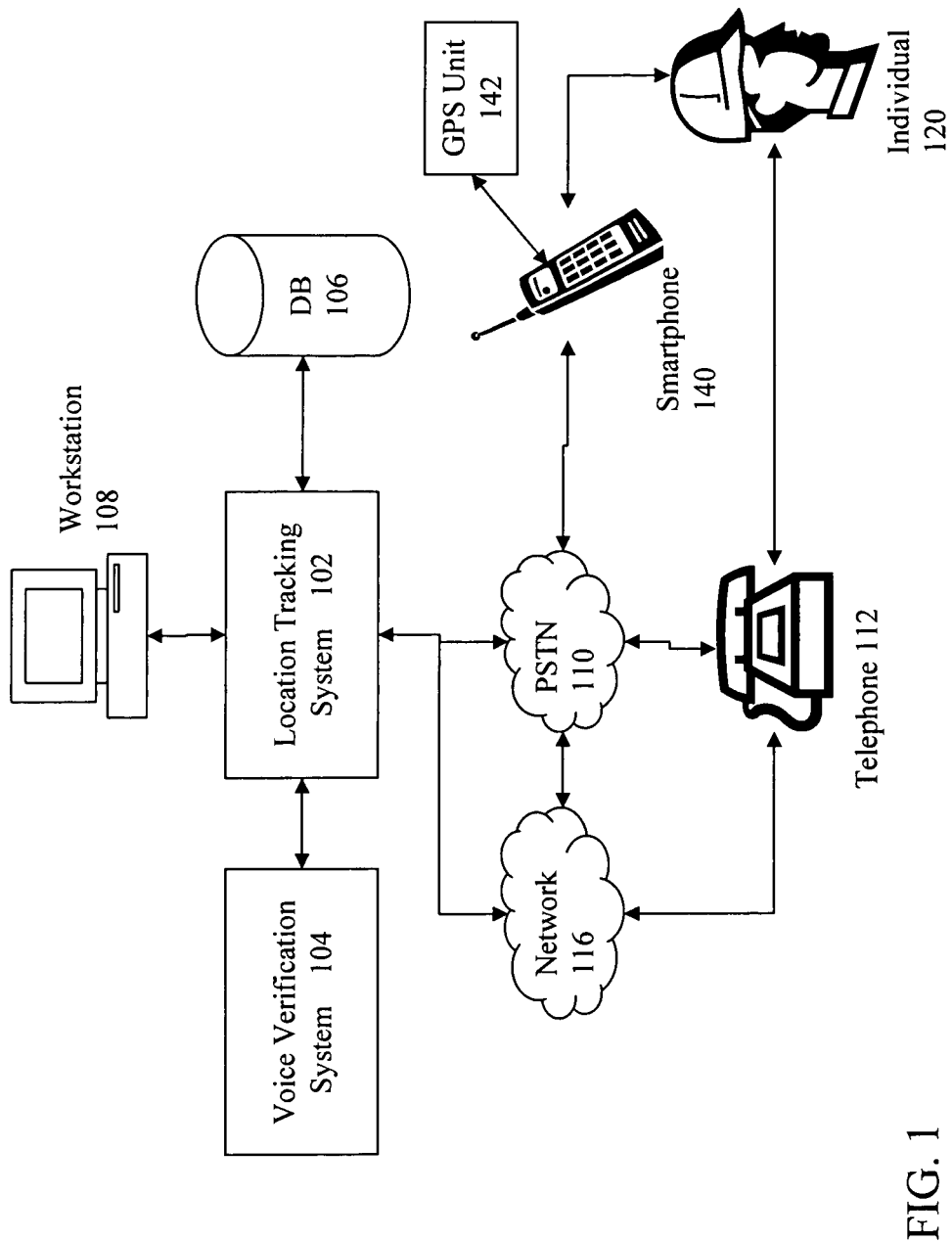
FIG. 1 is a block diagram illustrating a network architecture for a system providing for tracking the location of individuals, according to one embodiment of the present invention.

FIG. 1 is a block diagram illustrating a network architecture for a system providing for tracking the location of individuals, according to one embodiment of the present invention. FIG. 1 shows a location tracking system 102 and a voice verification system 104 that substantially perform the processes of the present invention. The location tracking system 102 and the voice verification system 104 may each comprise one or more servers, workstations or other computer systems.

In one embodiment of the present invention, the location tracking system 102 is connected to the Public Switched Telephone Network (PSTN) 110, which is the network of the world's public circuit-switched telephone networks, including any mobile telephone networks. In this embodiment, a land-line telephone 112 of the individual 120 is connected to the PSTN 110 such that the location tracking system 102 may initiate telephone calls to the telephone 112 of the individual 120. Alternatively, the location tracking system 102 is connected to the PSTN 110 via the network 116, which may be a packet switched network such as the global Internet (a public IP-based packet-switched network), a private Intranet or the like.

In this embodiment, the landline telephone 112 is a telephone positioned at a desired location, wherein a desired location refers to a location where the individual 120 must be located in order to be compliant with a restriction on movement. In one alternative, the landline telephone 112 is programmed or blocked so as not to allow call forwarding or other features that allow someone in a remote location to appear as if they are present at the location of the landline telephone 112.

In another embodiment of the present invention, the telephone of the individual is a mobile telephone 140, or a smart phone, that is integrated with a GPS system 142 or other location defining device. The device 140 further includes memory on which a set of predefined locations, such as GPSP coordinates, and a telephone number of the system 102 can be stored. Each of the predefined locations is a location where the individual 120 must be located in order to be compliant with a restriction on movement.

In another embodiment of the present invention, the location tracking system 102 is connected directly to the network 116, such that the location tracking system 102 utilizes the Voice over IP (VoIP) protocol to deliver sound over the network 116 to the VoIP audio device (telephone 112) of the individual 120 to conduct a call.

FIG. 1 also includes voice verification system 104 connected to location tracking system 102. A voice verification system is a system that verifies the identify of a user using a sample of the user's voice. In one embodiment of the present invention, the voice verification system 104 may a confidence-based speaker identification system, as disclosed in co-owned U.S. Pat. No. 7,039,587, which is hereby incorporated by reference in its entirety. A speech recognition system is included within either voice verification system 104 or location tracking system 102. In an embodiment of the present invention, the speech recognition system may be any commercially available speech recognition system such as the IBM WebSphere Voice Server Speech Engine available from International Business Machines Corp. of Armonk, N.Y.

FIG. 1 further includes a database 106 that acts as a repository for information used during the individual tracking process. Examples of the type of information that may be stored in the database 106 includes voice print information corresponding to users, telephone number information pertaining to users, audio files including questions provided to users, time period indicators that indicate when users are called and rules used to determine when users are called.

Also connected to location tracking system 102 is workstation 108, which may be used for entering information into the database 106 (described above), for generating a voice print of a user, or for adjusting speech recognition parameters.

Figure 2:
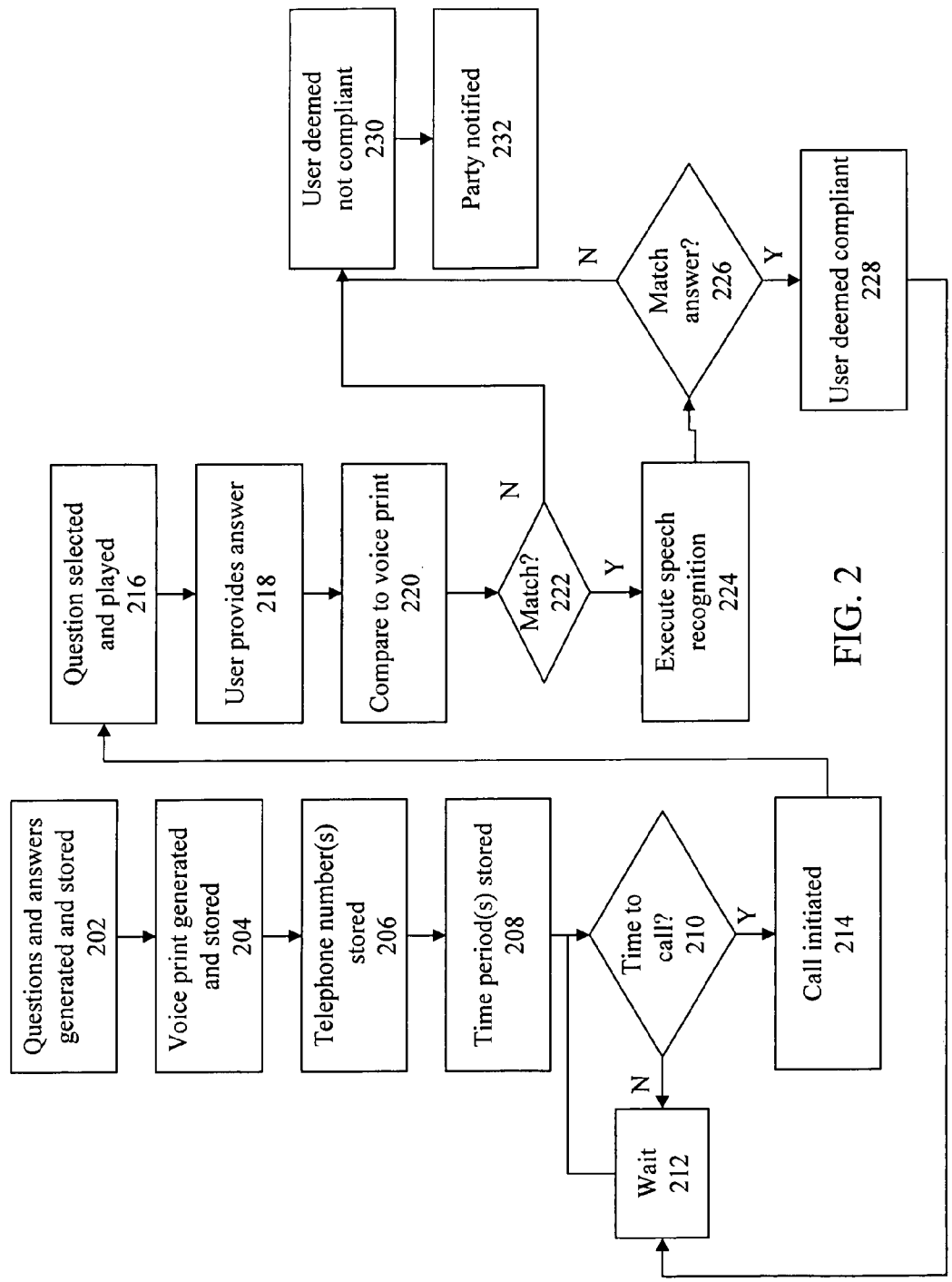
FIG. 2 is a flow chart depicting a general process for tracking the location of individuals, according to one embodiment of the present invention.

FIG. 2 is a flow chart depicting a general process for tracking the location of individuals, according to one embodiment of the present invention. In a first step 202, a set of questions and answers are entered into the location tracking system 102 and stored into database 106. The questions may range from questions pertaining to the identity of the user, such as a user's name or birth date, to questions that solicit a simple answer such as how to spell a small word or the result of a short mathematical operation. Questions are entered into the location tracking system 102 and stored into database 106 as an audio file, such as in WAV, AIFF, AU or MP3 format. Each question is associated with a correct answer that is also entered into the location tracking system 102 and stored into database 106 as an audio file.

In step 204, a voice print of the individual 120 is generated by the location tracking system 102 and stored in database 106. In one embodiment of the present invention, the voice print comprises a spectrogram, which is the result of calculating the frequency spectrum of windowed frames of a compound signal. A spectrogram is a three-dimensional plot of the energy of the frequency content of a signal as it changes over time. In one embodiment of the present invention, a voice print process as described in co-owned U.S. Pat. No. 7,039,587 is used in step 204.

In step 206, a telephone number of the individual 120 is stored in database 106. The telephone number must identify a landline telephone 112 or other type of telephonic device that is stationary at a desired location of the individual and which cannot be moved large distances.

In step 208, an indicator of when calls shall be made to the individual 120 is stored in the database 106. In one embodiment of the present invention, a time period, such as every 24 hours or every 2 days, is stored in the database 106. In another embodiment of the present invention, an indicator to call at random times is stored in the database 106. In yet another embodiment of the present invention, more detailed descriptions indicating when calls shall be made are stored in the database 106. In this embodiment, a detailed description may include a time of day, a day of the week, a day of the month, random time of the day or any combination of the above. One example of a detailed description indicating when a call shall be made includes "call every Monday at 3 pm and every Thursday at a random time."

In step 210, the location tracking system 102 checks database 106 for the indicator of when calls shall be made to the individual 120 and determines whether a call shall me made according to the indicator. If the result of this determination is positive, then controls flows to step 214. Otherwise, control flows to step 212 where a time period is allowed to lapse before control flows back to step 210. In step 214, the location tracking system 102 retrieves the telephone number of the individual 120 from database 106 and a call is initiated to the telephone 112 of the individual 120. The individual 120 receives the telephone call and a session commences.

In step 216, the location tracking system 102 selects one of the audio files corresponding to a plurality of questions stored in the database 106. The location tracking system 102 may select one of the audio files sequentially, randomly, or according to a schedule. Subsequently, the location tracking system 102 plays the selected audio file such that the individual 120 hears the audio file over the telephone 112. In step 218, the individual 120 provides an oral answer over the telephone 112 in response to the selected audio file. The location tracking system 102 stores the oral answer provided by the individual 120 over the telephone 112 as an audio file.

In step 220, the location tracking system 102 compares the audio file of the answer provided by the individual 120 to the previously stored voice print of the individual 120 in database 106. In step 222, it is determined whether the audio file of the answer provided by the individual 120 matches the previously stored voice print of the individual 120 in database 106. If the result of this determination is positive, then controls flows to step 224. Otherwise, control flows to step 230 where the user is deemed non-complaint with a restriction on movement and an administrator or other person of authority is notified over telephone, email or mail in step 232.

In step 224, a speech recognition process of an embedded speech recognition server is executed upon the audio file of the answer provided by the individual 120. In step 226, it is determined whether the audio file of the answer provided by the individual 120 matches the previously stored correct answer corresponding to the selected question in database 106. If the result of this determination is positive, then controls flows to step 228. Otherwise, control flows to step 230 where the user is deemed non-complaint with a restriction on movement and an administrator or other person of authority is notified over telephone, email or mail in step 232. In step 228, the user is deemed complaint with a restriction on movement and an administrator or other person of authority is optionally notified over telephone, email or mail.

In one embodiment of the present invention, the control flow of FIG. 2 can be combined with other types of biometric verification. For example, the control flow of FIG. 2 can be combined with a finger print scanner or a camera that prompts the user to provide particular poses.

Figure 3:
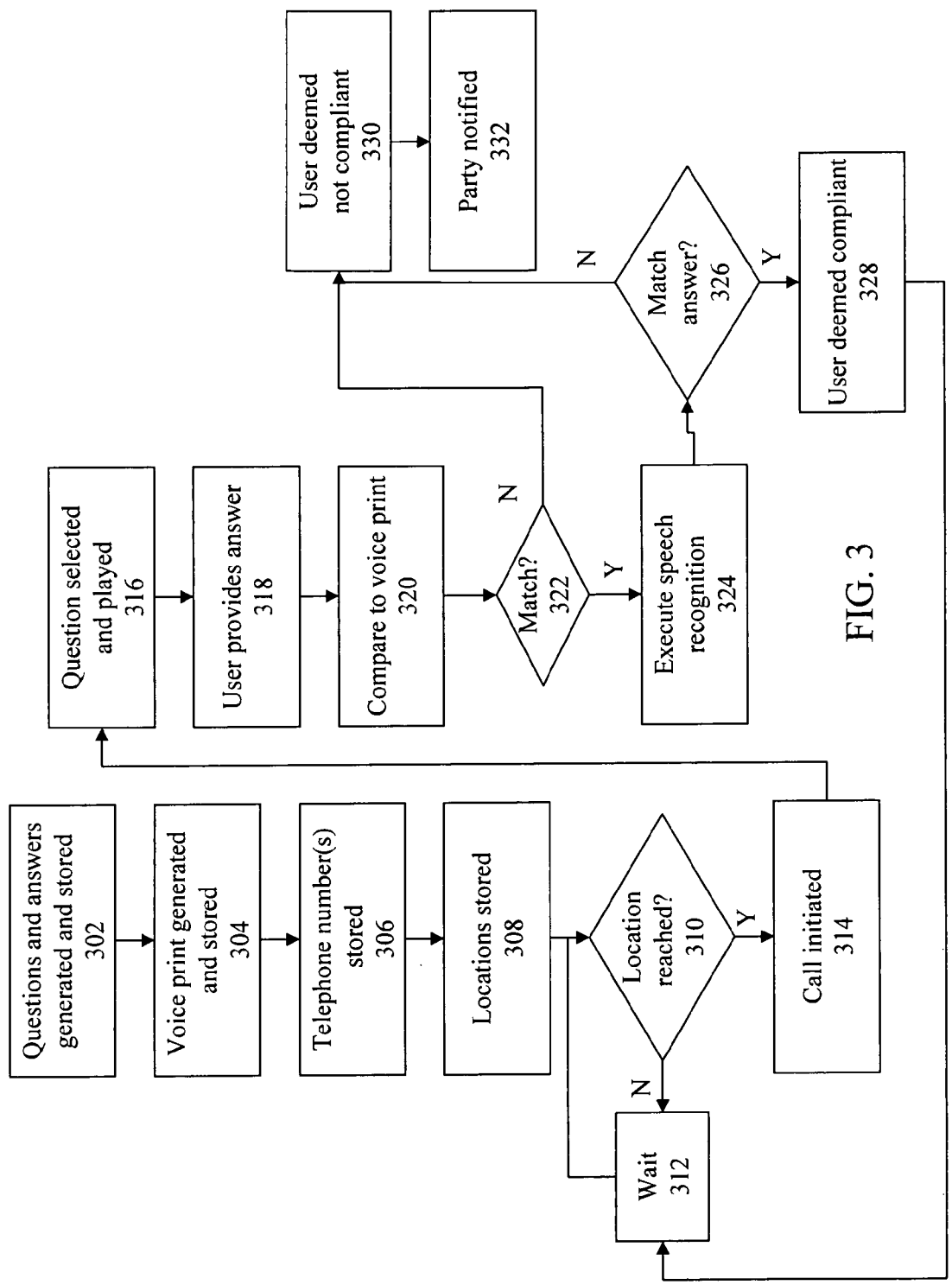
FIG. 3 is a flow chart depicting an alternative process for tracking the location of individuals, according to one embodiment of the present invention.

FIG. 3 is a flow chart depicting an alternative process for tracking the location of individuals, according to one embodiment of the present invention. The flow chart of FIG. 3 is similar to the flow chart of FIG. 2 except that the flow chart of FIG. 3 includes a GPS-enabled mobile telephone that initiates calls to the system 102. This embodiment may be used to verify the location of an individual at a certain place at certain times, such as delivery drivers or security personnel, for example.

In a first step 302, a set of questions and answers are entered into the location tracking system 102 and stored into database 106. In step 304, a voice print of the individual 120 is generated by the location tracking system 102 and stored in database 106. In step 306, a telephone number of the location tracking system 102 is stored in mobile telephone 140. In step 308, a set of predefined locations, such as a set of GPS coordinates, is stored in the mobile telephone 140.

In step 310, the mobile telephone 140 checks the GPS module 142 and determines whether a predefined location has been reached and therefore a call shall me made to the system 102. If the result of this determination is positive, then controls flows to step 314. Otherwise, control flows to step 312 where a time period is allowed to lapse before control flows back to step 310. In step 314, the mobile telephone 140 initiates a call to the system 102. The system 102 receives the telephone call and a session commences.

In step 316, the location tracking system 102 selects one of the audio files corresponding to a plurality of questions stored in the database 106. Subsequently, the location tracking system 102 plays the selected audio file such that the individual 120 hears the audio file over the telephone 140. In step 318, the individual 120 provides an oral answer over the telephone 140 in response to the selected audio file. The location tracking system 102 stores the oral answer as an audio file.

In step 320, the location tracking system 102 compares the audio file of the answer provided by the individual 120 to the previously stored voice print of the individual 120 in database 106. In step 322, it is determined whether the audio file of the answer provided by the individual 120 matches the previously stored voice print of the individual 120 in database 106. If the result of this determination is positive, then controls flows to step 324. Otherwise, control flows to step 330 where the user is deemed non-complaint with a restriction on movement and an administrator or other person of authority is notified over telephone, email or mail in step 332.

In step 324, a speech recognition process of an embedded speech recognition server is executed upon the audio file of the answer provided by the individual 120. In step 326, it is determined whether the audio file of the answer provided by the individual 120 matches the previously stored correct answer corresponding to the selected question in database 106. If the result of this determination is positive, then controls flows to step 328. Otherwise, control flows to step 330 where the user is deemed non-complaint with a restriction on movement and an administrator or other person of authority is notified over telephone, email or mail in step 332. In step 328, the user is deemed compliant with a restriction on movement and an administrator or other person of authority is optionally notified over telephone, email or mail.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for tracking the location of an individual, comprising:
   selecting a first audio clip from a plurality of audio clips, wherein each audio clip comprises a different question for the individual and wherein a correct answer corresponds to each audio clip;
   initiating a telephone call to a telephone of the individual at a desired location in which the individual must be present in order to complaint with a restriction on movement, the compliance with the restriction on movement being determined based upon the individual providing a correct answer to a question contained in a particular one of the audio clips and providing speech audio input that matches a pre-stored voice print;
   playing the first audio clip for the individual via the telephone call;
   receiving an oral response to the first audio clip from the individual via the telephone call;
   executing a speech recognition process upon the oral response;
   comparing the oral response to a voice print of the individual; and
   storing a record indicating that the individual is compliant with the restriction on movement only if the oral response matches the correct answer corresponding to the first audio clip and the oral response matches the voice print and the individual is present at the desired location.

2. The method of claim 1, further comprising:
   storing a record indicating that the individual is not compliant if either the oral response does not match the correct answer corresponding to the first audio clip or the oral response does not match the voice print.

3. The method of claim 2, further comprising:
   sending a message to an administrator indicating that the individual is not compliant if either the oral response does not match the correct answer corresponding to the first audio clip or the oral response does not match the voice print.

4. The method of claim 2, wherein the step of selecting further comprises:
   randomly selecting the first audio clip from the plurality of audio clips.

5. The method of claim 4, wherein the step of executing further comprises:
   executing a speech recognition process upon the oral response and comparing speech recognized from the oral response to the correct answer corresponding to the first audio clip.

6. A computer program product comprising a non-transitory computer usable storage medium storing computer usable program code for tracking the location of an individual, comprising:
   computer usable program code for selecting a first audio clip from a plurality of audio clips, wherein each audio clip comprises a different question for the individual and wherein a correct answer corresponds to each audio clip;

computer usable program code for initiating a telephone call to a telephone of the individual at a desired location in which the individual must be present in order to complaint with a restriction on movement, the compliance with the restriction on movement being determined based upon the individual providing a correct answer to a question contained in a particular one of the audio clips and providing speech audio input that matches a pre-stored voice print;

computer usable program code for playing the first audio clip for the individual via the telephone call;

computer usable program code for receiving an oral response to the first audio clip from the individual via the telephone call;

computer usable program code for executing a speech recognition process upon the oral response;

computer usable program code for comparing the oral response to a voice print of the individual; and computer usable program code for storing a record indicating that the individual is compliant with the restriction on movement only if the oral response matches the correct answer corresponding to the first audio clip and the oral response matches the voice print and the individual is present at the desired location.

7. The computer program product of claim 6, further comprising:

computer usable program code for storing a record indicating that the individual is not compliant if either the oral response does not match the correct answer corresponding to the first audio clip or the oral response does not match the voice print.

8. The computer program product of claim 7, further comprising:

computer usable program code for sending a message to an administrator indicating that the individual is not compliant if either the oral response does not match the correct answer corresponding to the first audio clip or the oral response does not match the voice print.

9. The computer program product of claim 7, wherein the computer usable program code for selecting further comprises:

computer usable program code for randomly selecting the first audio clip from the plurality of audio clips.

10. The computer program product of claim 9, wherein the computer usable program code for executing further comprises:

computer usable program code for executing a speech recognition process upon the oral response and comparing speech recognized from the oral response to the correct answer corresponding to the first audio clip.

11. A server for tracking the location of an individual, comprising:

a repository for storing:
  a plurality of audio clips, wherein each audio clip comprises a different question for the individual and wherein a correct answer corresponds to each audio clip;
  a telephone number of the individual, the telephone number corresponding to a telephone at a desired location; and
  a voice print for the individual; and a computer processor configured for:
  selecting a first audio clip from the plurality of audio clips;
  initiating a telephone call to the telephone of the individual at the desired location in which the individual must be present in order to complaint with a restriction on movement, the compliance with the restriction on movement being determined based upon the individual providing a correct answer to a question contained in a particular one of the audio clips and providing speech audio input that matches a pre-stored voice print;
  playing the first audio clip for the individual via the telephone call;
  receiving an oral response to the first audio clip from the individual via the telephone call;
  executing a speech recognition process upon the oral response;
  comparing the oral response to the voice print; and
  storing a record indicating that the individual is compliant with the restriction on movement only if the oral response matches the correct answer corresponding to the first audio clip and the oral response matches the voice print and the individual is present at a location in which the individual must be present in order to be compliant.

12. The server of claim 11, wherein the processor is further configured for:

storing a record indicating that the individual is not compliant if either the oral response does not match the correct answer corresponding to the first audio clip or the oral response does not match the voice print.

13. The server of claim 12, further comprising:

a transmitter for sending a message to an administrator indicating that the individual is not compliant if either the oral response does not match the correct answer corresponding to the first audio clip or the oral response does not match the voice print.

14. The server of claim 12, wherein the processor is configured for:

randomly selecting the first audio clip from the plurality of audio clips.

15. The server of claim 14, wherein the processor is configured for:

executing a speech recognition process upon the oral response and comparing speech recognized from the oral response to the correct answer corresponding to the first audio clip.

16. A method for tracking the location of an individual, comprising:

receiving a telephone call that is automatically initiated by a mobile telephone when the mobile telephone reaches a predefined location at which an individual must be present to be in compliance with a restriction on movement, the compliance with the restriction on movement being determined based upon the individual providing a correct answer to a question contained in an audio clip and the individual providing speech audio input that matches a pre-stored voice print;

selecting a first audio clip from a plurality of audio clips, wherein each audio clip comprises a different question for the individual and wherein a correct answer corresponds to each audio clip;

playing the first audio clip for the individual via the telephone call;

receiving an oral response to the first audio clip from the individual via the telephone call;

executing a speech recognition process upon the oral response;

comparing the oral response to a voice print of the individual; and storing a record indicating that the individual is compliant with the restriction on movement only if the oral response matches the correct answer corresponding to the first audio clip and the oral response matches the voice print of the individual and the individual is present at a location in which the individual must be present in order to be compliant with the restriction on movement.

17. The method of claim 16, further comprising:

storing a record indicating that the individual is not compliant if either the oral response does not match the correct answer corresponding to the first audio clip or the oral response does not match the voice print.

18. The method of claim 17, further comprising:

sending a message to an administrator indicating that the individual is not compliant if either the oral response does not match the correct answer corresponding to the first audio clip or the oral response does not match the voice print.

* * * * *